Patented May 26, 1936

2,042,096

UNITED STATES PATENT OFFICE 2,042,096

HEAT INSULATION MATERIAL AND PROCESS OF MAKING SAME

Harold W. Greider, Plymouth Meeting, Pa., assignor to The Philip Carey Manufacturing Company, a corporation of Ohio No Drawing. Application April 18, 1929, Serial No. 356,298

33 Claims. (Cl. 18—48)

This invention relates to heat insulation materials and the manufacturing process thereof. It comprises new and useful materials and compositions of such materials.

Heat insulation materials, because of their relatively low conductivity of heat, are used to decrease the transmission of heat energy by conduction or radiation either to or from a particular body. The use of insulation to protect boilers, steam piping, etc., thus conserving fuel, is well known. No substance is perfectly efficient in its action as a heat insulating material, as all substances conduct heat to a certain extent. Certain materials are, however, more efficient than others. Also the efficiency of a particular material varies with the temperature at which it is used. Normally, of course, the greater the efficiency of an insulating material, that is, the lower its thermal conductivity, the more desirable it is for that purpose, but some insulation materials, otherwise efficient, cannot endure high temperatures and have other practical difficulties. An efficient insulating material which is widely used is light magnesium carbonate, especially as combined with asbestos fiber in molded insulations commonly known as "85% magnesia". Diatomaceous earth is also used for heat insulation.

It is the purpose of my invention to produce compositions of materials having superior properties both in regard to insulating efficiency and in regard to durability under conditions of use or shipment. In making heat insulation materials composed according to my invention, I employ certain novel means which I regard as my invention. Heat insulation materials composed according to my invention are superior in several respects to the materials and compositions of materials that have hitherto been known for heat insulation purposes, particularly for high temperatures, and it is the purpose of my invention to overcome many difficulties inherent in insulation materials which have been in commercial use heretofore.

The principal difficulty encountered with "85% magnesia", for example, is that at temperatures above 550° F. it tends to calcine and decompose to such an extent that it can not be used practically for insulating surfaces at higher temperatures. While very efficient and useful at temperatures below that limit, at higher temperatures the magnesium carbonate decomposes gradually to form magnesium oxide, carbon dioxide, and water. This calcination causes shrinkage of the material, cracking, gaps between insulation blocks, and loss of mechanical strength. The bonding properties of magnesium oxide, which is the solid decomposition product, are poor and the insulation becomes structurally weak and brittle.

Diatomaceous earth heat insulations are extremely brittle and its particles possess poor bonding properties. Such compositions therefore are deficient in mechanical strength and in shock resistance under usual conditions of shipment and use. Moreover, heat insulations composed mainly of diatomaceous earth are not as efficient in reducing heat losses, especially at high temperatures such as 550° F. to 1200° F., as materials composed according to my invention.

Where magnesium carbonate or diatomaceous earth are used in large proportions in the composition of heat insulation materials, either the calcining of the magnesium carbonate high temperatures or the brittleness due to the diatomaceous earth or both cause great practical difficulty. Other difficulties encountered in materials which have been available heretofore for high temperature insulation are excessive weight, low insulation efficiency and inability to resist the action of water.

According to my invention, I produce heat insulation materials which are of high efficiency, especially in service at high temperatures, such as 550° F. to 1200° F., which are mechanically strong and hard, which are tough rather than brittle, which are resistant to heat, so that they do not lose their strength and become soft and weak when exposed to high temperatures, and which resist the action of water. Insulation materials composed and produced according to my invention possess the above desirable properties in high degree and constitute heat insulation materials that are new and useful and give superior practical results. The materials which I use in my novel compositions are light basic magnesium carbonate, precipitated calcium carbonate, asbestos fiber, amphibole fiber, bentonite clay, hydrated lime, and diatomaceous earth. Minor amounts of other substances may be added without in any way departing from the scope of my invention.

The amphibole fiber which I use according to my invention is an asbestiform mineral, but is different from the usual soft, flexible asbestos mineral fiber in that the individual fibers are relatively short and frangible. I have found that its use tends to make insulation masses containing it of light and bulky character. It is chemically inert and has a very low water content. It is extremely resistant to high temperatures showing practically no change in structure up to 1600° F. When employed in amounts such as 1% to 25% with materials such as magnesium carbonate, calcium carbonate, diatomaceous earth, asbestos fiber and bentonite clay, I have found that it operates to increase the resistance of the combined material to heat, especially at high temperatures, and to a great extent prevents drying shrinkage and heat shrinkage by maintaining the structure of the material. The short frangible mineral fiber above described is referred to herein as amphibolic byssolitic type fiber as distinguished from the softer more flexible asbestos fiber which is referred to herein as amianthus type asbestos fiber or merely by the term "asbestos". Suitable amphibole fiber may be obtained from deposits located in California, Maryland, or North Carolina.

Bentonite clay I employ in amounts such as 1% to 10%. I prefer to use a modified bentonite clay which has been modified by mixing therewith about 2% to 100% of its weight of hydrated lime. Bentonite clay as thus modified I have found can be added directly to an aqueous mix of ingredients in the process of manufacture. If attempt is made to add unmodified bentonite clay directly to an aqueous mix, great trouble has heretofore been experienced due to the tendency of bentonite clay to form glutinous, gummy and slimy masses that are extremely difficult to disintegrate and disperse uniformly throughout the mix. The addition of hydrated lime I have found partially or completely flocculates the bentonite clay particles, depending on the proportion of hydrated lime added. I have found that when it is added in amounts as indicated above, a modified bentonite clay is produced which may be readily added and dispersed throughout the mix to serve as a binder for the mineral particles. However, as the addition of hydrated lime tends to decrease somewhat the plasticity of the bentonite clay, I prefer to add only enough hydrated lime to permit the mixture to be readily dispersed in the water of the mix. The amount required depends on factors such as the type and quality of bentonite clay used and the degree of modification of its properties that is desired. Under usual conditions the addition of about 10% of hydrated lime gives a modified bentonite clay which is satisfactory for my purpose.

The use of amphibole fiber above described and of mixtures of amphibole fiber with bentonite clay, especially in the modified form set forth above, I regard as new in the manufacture and composition of heat insulation material and as lying within the scope of my invention.

In commercial manufacture I find it of advantage that heat insulation materials composed according to my invention may be manufactured directly from what is known as "40% magnesia", a mixture containing about 40% magnesium carbonate and 60% calcium carbonate. This mixture is obtained from dolomite rock according to the usual method employed in the manufacture of magnesium carbonate, except that the calcium carbonate is not separated from the raw magnesia liquor. The magnesium carbonate is precipitated in the presence of the finely divided calcium carbonate, by heating the raw magnesia liquor in the usual manner, with the result that the calcium carbonate and magnesium carbonate form an intimately commingled mixture of finely-divided, bulky, particles. This offers a very cheap and ready source of light magnesium carbonate and precipitated calcium carbonate. While I prefer to use "40% magnesia" thus obtained from dolomite rock, I do not regard my invention as limited to this source of magnesium and calcium carbonates as I may add light magnesium carbonate and calcium carbonate obtained from other sources and not previously commingled. Heat insulation materials composed according to my invention may be made using 60% to 85% of "40% magnesia".

Magnesium carbonate and calcium carbonate constitute the major proportion of heat insulation materials composed according to my invention and chiefly account for their lightness and high efficiency. I may employ from 15% to 50% of magnesium carbonate and from 35% to 65% of calcium carbonate and obtain a satisfactory product. Minor amounts of asbestos fiber and diatomaceous earth are added, respectively, to increase structural strength and to facilitate draining the excess water in molding. They are of course in themselves heat insulation materials resistant to heat, but I prefer to use only small amounts of diatomaceous earth to avoid its effect in larger amounts of making the insulation brittle.

The following is illustrative of heat insulations composed according to my invention:

|  | Per cent |
|---|---|
| Magnesium carbonate | 15–50 |
| Calcium carbonate | 35–65 |
| Asbestos fiber | .3–10 |
| Amphibole fiber | 1–25 |
| Bentonite clay | 1–10 |
| Hydrated lime | .02–10 |
| Diatomaceous earth | 1– 5 |

A very satisfactory insulation can be made using substantially the following proportions as preferred form:

| | | Percent |
|---|---|---|
| Magnesium carbonate percent | 30 | "40% magnesia"— 75 |
| Calcium carbonate percent | 45 | |
| Asbestos fiber | | 7.5 |
| Amphibole fiber | | 7.5 |
| Bentonite clay | | 5.5 |
| Hydrated lime | | 0.5 |
| Diatomaceous earth | | 3 |
| Inert material (color, impurities, etc.) | | 1 |

Heat insulations composed according to my invention may be manufactured according to usual methods. They may be made by mixing the materials with water and molding the mix. For example, molded heat insulation may be satisfactorily made by mixing the ingredients with water to form a semi-fluid or plastic mix, molding the mix while wet, and removing the excess water from the molds under pressure.

Heat insulation materials composed according to my invention are very efficient, especially at high temperatures, such as 550° F. to 1200° F. It is a feature of my insulation materials that with increase of temperature of the surface upon which they are used, the loss of heat through them increases only slightly. When the temperature is increased the increased loss of heat energy through my insulation is much less than with other high temperature insulations now on the market. Thus while my insulation materials are somewhat more efficient than diatomaceous earth, for example, when used at temperatures such as 550° F., they become in a very great degree more efficient at temperatures such as 1000° F. Even at 550° F. the efficiency of my insulations is comparable to that of most makes of 85% magnesia on the market.

In addition to their high efficiency heat insulations composed according to my invention are resistant to heat and do not lose their mechanical strength as is the case when "85% magnesia" is used at temperatures above 550° F. They show virtually no loss of strength and hardness below 750° F. My insulations may be used to great advantage up to temperatures as high as 1200° F. They resist shrinkage and cracking and gapping between insulation blocks. They remain tough and durable under conditions of use and shipment and are not brittle or subject to breakage under mechanical impact. They are composed of cheap and readily available materials. Moreover, heat insulation materials composed according to my invention resist the action of water. They may be soaked in water for long periods and when dried out again their strength and efficiency will not have been substantially impaired.

The above advantages constitute heat insulation materials composed according to my invention of great practical use and advantage and my invention represents a great improvement in the composition and manufacture of heat insulation materials.

I claim:

1. Heat insulation material containing substantial bulk of basic magnesium carbonate and precipitated calcium carbonate, bentonite clay, diatomaceous earth, soft flexible asbestos mineral fiber as a binder material, and amphibole fiber, the fibers of which amphibole fiber are shorter and more frangible than the fibers of the asbestos fiber and have a lower water content and more resistance to high temperatures than the fibers of the asbestos fiber, said amphibole fiber being present in an amount effective to inhibit shrinkage of the insulation material.

2. Heat insulation material containing substantial bulk of basic magnesium carbonate and precipitated calcium carbonate, bentonite clay, hydrated lime to modify the plastic and water dispersive properties of said bentonite clay, diatomaceous earth, soft flexible asbestos mineral fiber as a binder material, and amphibole fiber, the fibers of which amphibole fiber are shorter and more frangible than the fibers of the asbestos fiber and have a lower water content and more resistance to high temperatures than the fibers of the asbestos fiber, said amphibole fiber being present in an amount effective to inhibit shrinkage of the insulation material.

3. Heat insulation material containing 15% to 50% basic magnesium carbonate and 35% to 65% precipitated calcium carbonate, bentonite clay, diatomaceous earth, soft flexible asbestos mineral fiber as a binder material, and amphibole fiber, the fibers of which amphibole fiber are shorter and more frangible than the fibers of said asbestos fiber and have a lower water content and more resistance to high temperatures than the fibers of said asbestos fiber, said amphibole fiber being present in an amount effective to inhibit shrinkage of the insulation material.

4. Heat insulation material containing 15% to 50% basic magnesium carbonate and 35% to 65% precipitated calcium carbonate, bentonite clay, hydrated lime to modify the plastic and water-dispersive properties of the bentonite clay, diatomaceous earth, soft flexible asbestos mineral fiber as a binder material, and amphibole fiber, the fibers of which amphibole fiber are shorter and more frangible than the fibers of said asbestos fiber and have a lower water content and more resistance to high temperatures than the fibers of said asbestos fiber, said amphibole fiber being present in an amount effective to inhibit shrinkage of the insulation material.

5. Heat insulation material containing 60% to 85% of "40% magnesia" and containing diatomaceous earth, bentonite clay, hydrated lime to modify the plastic and water-dispersive properties of the bentonite clay, soft flexible asbestos mineral fiber as a binder material, and amphibole fiber, the fibers of which amphibole fiber are shorter and more frangible than the fibers of said asbestos fiber and have a lower water content and more resistance to high temperatures than the fibers of said asbestos fiber, said amphibole fiber being present in an amount effective to inhibit shrinkage of the insulation material.

6. Light bulky heat insulation material molded under pressure in filter molds from a semi-fluid water mix with drainage of excess water from the molds and drying of the molded forms, which comprises substantial bulk of basic magnesium carbonate and precipitated calcium carbonate and bentonite clay, diatomaceous earth, soft flexible asbestos mineral fiber as a binder material, and amphibole fiber, the fibers of which amphibole fiber are shorter and more frangible than the fibers of said asbestos fiber and have a lower water content and more resistance to heat than the fibers of said asbestos fiber, said amphibole fiber being present in effective amount to inhibit shrinkage of the insulation material.

7. Heat insulation material containing amphibole fiber of the shorter more frangible byssolitic type as distinguished from the softer, longer and more flexible amianthus type asbestos fiber.

8. Molded heat insulation material molded in filter-molds from a semi-fluid water mix with expulsion of water from the molds containing about 1% to 25% by weight of amphibole fiber of the shorter more frangible byssolitic type as distinguished from the softer, longer and more flexible amianthus type asbestos fiber.

9. Heat insulation material containing amphibole fiber of the shorter more frangible byssolitic type as distinguished from the longer and more flexible amianthus type asbestos fiber in amount effective to inhibit shrinkage of the heat insulation material and bentonite clay to counteract the counter-plasticizing effect of the byssolitic amphibole fiber.

10. Heat insulation material containing bentonite clay and hydrated lime, the hydrated lime being present in effective amount to modify the plastic and water-dispersive properties of the bentonite clay.

11. Heat insulation material containing amphibole fiber of the shorter and more frangible byssolitic type as distinguished from the softer, longer and more flexible amianthus type asbestos fiber in amount effective to inhibit shrinkage of the heat insulation material, bentonite clay to counteract the counter-plasticizing effect of the byssolitic amphibole fiber, and hydrated lime to modify the plastic and water-dispersive properties of the bentonite clay.

12. Heat insulation material containing by weight amphibole fiber 1% to 25%; bentonite clay 1% to 10%, and hydrated lime .02% to 10%.

13. Heat insulation material containing the following ingredients by weight:

| | Per cent |
|---|---|
| Basic magnesium carbonate | 15–50 |
| Precipitated calcium carbonate | 35–65 |
| Asbestos fiber | 3–10 |
| Amphibole fiber | 1–25 |
| Bentonite clay | 1–10 |
| Hydrated lime | .02–10 |
| Diatomaceous earth | 1– 5 |

14. Heat insulation material composed substantially of the following ingredients:

| | Per cent |
|---|---|
| Basic magnesium carbonate 30%  Precipitated calcium carbonate 45% } "40% magnesia" | 75 |
| Asbestos fiber | 7.5 |
| Amphibole fiber | 7.5 |
| Bentonite clay | 5.5 |
| Hydrated lime | 0.5 |
| Diatomaceous earth | 3 |
| Inert material | 1 |

15. In a process of making heat insulation material containing bentonite clay and other ingredients wherein said ingredients are mixed with water and molded, the steps comprising modifying the plastic and water dispersive properties of bentonite clay by dry mixing therewith 2% to 100% of its weight of hydrated lime prior to incorporation with the water of the mix and incorporating said bentonite clay so modified with the water of the mix.

16. The process of dispersing bentonite clay in water, said process comprising the dry mixing of finely-divided bentonite clay with finely-divided hydrated lime, and incorporating said mixture with water.

17. The process comprising mixing bentonite clay with 2% to 100% of its weight of hydrated lime, and incorporating said mixture with a weight of water substantially in excess of the weight of said mixture.

18. Modified bentonite clay, comprising a dry mixture of finely-divided bentonite clay with substantially 10% of its weight of finely-divided hydrated lime, the hydrated lime being effective to modify the plastic and water-dispersive properties of the bentonite clay.

19. A binding composition for heat insulation materials made by molding a water mix containing finely divided, inorganic, solid ingredients, said composition comprising bentonite clay modified as to plastic, swelling, and water dispersive properties by dry mixing with hydrated lime.

20. A composition of matter comprising a dry mixture of finely-divided bentonite clay with hydrated lime, the hydrated lime being present in effective amount to modify the plastic and water-dispersive properties of the bentonite clay.

21. Heat insulation material containing by weight 1% to 25% of byssolitic type short frangible mineral amphibolic fiber; bentonite clay 1% to 10%, and hydrated lime .02% to 10%.

22. Heat insulation material containing the following ingredients by weight:

| | Per cent |
|---|---|
| Basic magnesium carbonate | 15–50 |
| Precipitated calcium carbonate | 35–65 |
| Asbestos fiber | 3–10 |
| Amphibolic byssolitic type fiber | 1–25 |
| Bentonite clay | 1–10 |
| Hydrated lime | .02–10 |
| Diatomaceous earth | 1– 5 |

23. Heat insulation material composed substantially of the following ingredients:

| | Per cent |
|---|---|
| Basic magnesium carbonate 30%  Precipitated calcium carbonate 45% } "40% magnesia" | 75 |
| Asbestos fiber | 7.5 |
| Amphibolic byssolitic type fiber | 7.5 |
| Bentonite clay | 5.5 |
| Hydrated lime | 0.5 |
| Diatomaceous earth | 3 |
| Inert material | 1 |

24. Heat insulation material molded under pressure in filter-molds from a semi-fluid water mix with drainage of excess water from the molds and drying of the molded forms which comprises basic magnesium carbonate, precipitated calcium carbonate, fibrous asbestiform mineral, bentonite clay and diatomaceous earth.

25. Heat insulation material containing 15% to 50% basic magnesium carbonate and 35% to 65% precipitated calcium carbonate, and containing substantial quantities of fibrous asbestiform mineral, diatomaceous earth and bentonite clay.

26. Heat insulation material containing about 15% to 50% of basic magnesium carbonate, about 35% to 65% of precipitated calcium carbonate, about 4% to 35% fibrous asbestiform mineral, about 1% to 10% of bentonite clay and about 1% to 5% of diatomaceous earth.

27. Heat insulation material containing by weight asbestiform fiber 1% to 25%, bentonite clay 1% to 10% and hydrated lime .02% to 10%.

28. A process of making molded heat insulation material containing bentonite clay, hydrated lime and other solid ingredients which comprises mixing said bentonite clay with an amount of hydrated lime effective to substantially modify the plastic and water-dispersive properties of the bentonite clay, incorporating the mixture of bentonite clay and hydrated lime with water, mixing the water, bentonite clay, hydrated lime and other solid ingredients to form a substantially homogeneous semi-fluid water mix, and molding the water mix in filter-molds with expulsion of excess water from the molds.

29. A process of making molded heat insulation material containing bentonite clay, hydrated lime, asbestiform mineral fiber, basic magnesium carbonate and diatomaceous earth which comprises dry mixing of the bentonite clay with an amount of hydrated lime effective to substantially modify the plastic and water-dispersive properties of the bentonite clay, incorporating the mixture of bentonite clay and hydrated lime with water, mixing the water, bentonite clay, hydrated lime, basic magnesium carbonate and diatomaceous earth to form a semi-fluid water mix, and molding the mix in filter-molds with expulsion of excess water from the molds.

30. A process of making heat insulation material containing bentonite clay, hydrated lime, asbestos fiber, amphibolic byssolitic type fiber shorter and more frangible than said asbestos fiber, light basic magnesium carbonate, precipitated calcium carbonate and diatomaceous earth, which comprises dry mixing of the bentonite clay with an amount of hydrated lime effective to substantially modify the plastic and water-dispersive properties of the bentonite clay, mixing the water, bentonite clay, hydrated lime, asbestos fiber, amphibolic byssolitic type fiber, light basic magnesium carbonate, precipitated calcium carbonate, and diatomaceous earth to form a semi-fluid water mix, and molding the mix in filter-molds with expulsion of excess water from the molds.

31. The process of making molded heat insulation which comprises making a semi-fluid water mix containing a minor proportion of bentonite clay and diatomaceous earth and a major proportion of other solid ingredients and molding the mix in filter-molds with expulsion of excess water from the molds.

32. Heat insulation material molded under pressure in filter-molds from a semi-fluid water mix with drainage of excess water from the molds and drying of the molded forms which comprises basic magnesium carbonate, precipitated calcium carbonate, fibrous asbestiform mineral and bentonite clay.

33. Heat insulation material containing 15% to 50% basic magnesium carbonate and 35% to 65% precipitated calcium carbonate, and containing substantial quantities of fibrous asbestiform mineral and bentonite clay.

HAROLD W. GREIDER.